United States Patent [19]

Yung et al.

[11] 4,148,960

[45] Apr. 10, 1979

[54] POLYESTER HAVING IMPROVED ANTISTATIC PROPERTIES

[75] Inventors: Kai-Lim W. Yung; Bernard Silverman, both of Raleigh; Virginia C. Menikheim, Chapel Hill, all of N.C.

[73] Assignee: Monsanto Company, St. Louis, Mo.

[21] Appl. No.: 864,884

[22] Filed: Dec. 27, 1977

[51] Int. Cl.$^2$ .............................................. C08L 77/00
[52] U.S. Cl. .............................. 428/288; 260/857 PE; 260/857 PG; 428/296; 428/373
[58] Field of Search .................. 260/857 PE, 857 PG; 428/288, 296, 373

[56] References Cited

U.S. PATENT DOCUMENTS

| | | | |
|---|---|---|---|
| 3,366,608 | 1/1968 | Lincoln | 260/78 L |
| 3,522,369 | 7/1970 | Okazaki | 260/857 PG |
| 3,862,262 | 1/1975 | Hedrick | 260/857 PE |
| 3,922,254 | 11/1975 | Hedrick | 260/857 PG |
| 3,925,325 | 12/1975 | Heimich | 260/857 PG |
| 3,944,629 | 3/1976 | Hedrick | 260/857 PE |
| 3,965,075 | 6/1976 | Edwards | 260/857 PG |
| 3,993,709 | 11/1976 | Hedrick | 260/857 PE |
| 4,031,164 | 6/1977 | Hedrick | 260/857 PE |
| 4,034,015 | 7/1977 | Hedrick | 260/857 PE |

*Primary Examiner*—Paul Lieberman
*Attorney, Agent, or Firm*—Howard C. Stanley; Herman O. Bauermesiter

[57] ABSTRACT

Melt blended shaped objects, fibers and fabrics of polyesters with lactam-polyol-polyacyl lactam or -acyl polylactam terpolymers have desirable anti-static properties with the improvement resulting from the presence of the polyol content of the said terpolymer. Such fibers are useful for carpeting, draperies, apparel and nonwoven fabrics.

14 Claims, No Drawings

POLYESTER HAVING IMPROVED ANTISTATIC PROPERTIES

BACKGROUND OF THE INVENTION

FIELD OF THE INVENTION

This invention relates to a process for the production of shaped objects such as films, fibers and fabrics characterized by good antistatic properties, and also the use thereof in nonwoven materials. More specifically, this invention relates to two-component mixtures of polyesters with at least 5.1 wt. % polyol content derived from terpolymers comprising lactams, polyols and polyacyl lactams. The preferred range of polyol is 5.1 to 25%, and still more preferably 5.1% to 10% by weight, referred to the total composition in the composite article.

The production of fibers and fabrics with antistatic properties has long been an objective in the textile industry. However, many of the additives employed have had undesirable properties e.g. hygroscopicity, water extractability and stickiness. The present invention in providing a two-component polymeric melt blend makes it unnecessary to add an additive such as a metal salt since the desired antistatic effect is obtained directly from the said polymeric components.

The present invention includes fibers and other shaped articles such as films and cast objects, based upon the combination of a polyester such as polyethylene terephthalate together with the lactam terpolymers. The products of the invention are characterized by improved antistatic properties. The products acquire very little static charge and the static buildup is readily dissipated. This is a highly useful property in fabrics intended for various applications such as carpeting.

In order to prepare the desired polymeric compositions, the components are melt blended such as by grinding the individual polymers, and melting the fine powder or pellets or particles such as by charging the individual components to an extruder in which the components are melted in the screw of the extruder before being passed to a forming area such as a spinning area or a film forming area, or an injection molding area. A preferred embodiment is the spinning of the said melt blend into fibers. These fibers are highly useful per se and may be processed by conventional means such as texturizing and ultimately woven into fabrics.

One special embodiment of the invention is to provide fibers of anti-static, non-woven fabrics. In the following description the term "fibers" includes continuous filaments, staple fibers and yarns thereof. According to the invention, the melt blended fibers of a polyester and the lactam terpolymer can be bonded, e.g. thermally bonded to result in fabrics having integrity bonding.

The formation of a non-woven fabric from the discrete fibers is accomplished by calendering the fibers as a web between heated rolls, e.g., hot calendering 100° C. to 210° C. This may be carried out with a plain roll and a roll with a patterned surface. An appropriately patterned roll can be used to produce any desired pattern or heavy or primary bonded segments where the non-woven fabric is nipped between the rolls during calendering. If desired, both rolls may also be patterned to provide a desired design.

EXAMPLES

The specific lactam terpolymer used in the following examples contains 30% by weight of a polyglycol (which is a polyethylene glycol of about 3500 molecular weight).

TABLE I

Honestometer Tests 72° F., 31% Relative Humidity (RH)

| Sample | (Millivolts) Initial Charge | (Seconds) Half-Life Time | (Millivolts) (Charge Detected at end of Decay) |
|---|---|---|---|
| Example 1 100% PET | 1320 | (Very Long Half Life) | 1200 |
| Example 2 75/25 PET/lactam terpolymer (7.5 Wt. % Polyol) | 1120 | 9 | 280 |
| Example 3 50/50 PET/lactam terpolymer (15 Wt. % Polyol) | 1220 | 9 | 330 |
| Example 4 Bleached Cotton Sheeting | 1000 | 14 | 270 |
| Example 5 Bleached and Scoured Cotton Sheeting | 1100 | 17 | 280 |

An Honestometer was used to compare the anti-static properties of properties of fibers of polyethylene terephthalate (PET) melt-blended with various proportions of the lactam terpolymer, expressed as wt. % of the total composition. The comparison of the anti-static properties of some of these fiber blends are presented in Table I.

The large improvement in the antistatic properties of polyethylene terephthalate by melt blending with the lactam-polyol-acyl polylactam, also called lactam block terpolymer is surprising since at 31% RH the moisture regain of the lactam terpolymer used alone is not much higher than 4%. The antistatic properties of the present polyester melt blends are good not only because of the low level of static developed but also because of their performance in retaining the antistatic properties after laundering. The polyol content derived from the lactam terpolymer component is an integral part of the product, and thus is not washed out by contact with water. The present products therefore retain the antistatic properties even after washing.

Coupled with these good antistatic properties, the fibers of the melt blends of the polyester with the lactam terpolymer also have good physical properties. The data of fiber tensile tests is summarized as follows:

TABLE II

| Instron Tests Meltblend Compositions | Denier | Draw Ratio | Tenacity (gm/den) | Elongation (%) | Modulus (gm/den) |
|---|---|---|---|---|---|
| Example 1 100% PET(Dry) | 59.0 | 5.5X | 4.19 | 17.8 | 99.0 |
| (Wet) | 59.0 | 5.5X | 4.53 | 16.6 | 103.0 |
| Example 2 75/25 (Dry) | 63.5 | 5.5X | 3.63 | 27.9 | 76.9 |
| (PET/ (Wet) lactam terpol.) | 63.5 | 5.5X | 3.42 | 30.7 | 68.0 |
| Example 3 50/50 (Dry) | 120.0 | 5.0X | 3.14 | 20.4 | 52.0 |
| (PET/ (Wet) lactam terpol.) | 120.0 | 5.0X | 2.59 | 16.8 | 40.3 |
| Example 6 25/75 (Dry) | 213.0 | 5.0X | 2.51 | 30.7 | 16.3 |
| (PET/ (Wet) lactam terpol.) | 213.0 | 5.0X | 1.84 | 31.7 | 5.9 |

The following antistatic data show that other polyesters such as polybutylene terephthalate are also improved by the incorporation of a lactam terpolymer.

TABLE III

Polybutylene Terephthalate With Lactam Terpolymer

| Wt. % Polyol in Total Mix | Initial Charge Received by Sample (Millivolts) | Static Half-Life (Seconds) | Charge at End of Decay Period (Millivolts) |
| --- | --- | --- | --- |
| Example 7 0 | 573 | Over 44 | 420 |
| Example 8 5.1% | 206 | 3 | 0 |

The above data show that the use of the lactam terpolymer to provide a polyol component in the polybutylene terephthalate melt blend improves static charge dissipation and reduces static charge build-up drastically. It is also shown that the incorporation of the lactam terpolymer does not alter the physical properties of the polybutylene terephthalate fibers substantially.

TABLE IV (Polybutylene Terephthalate)/Lactam Terpolymer Fibers

| | Example 8 (5.1 Wt. % Polyol) | Example 7 (0% Polyol) |
| --- | --- | --- |
| Draw Ratio | (4X) | (4X) |
| Denier/Filiament | 21.4 | 3.2 |
| Breaking Elongation (%) | 75.4 | 92.6 |
| Tenacity (gm/den) | 2.94 | 2.95 |
| Initial Modulus (gm/den) | 13.8 | 21.1 |
| Rupture Energy (gm/cm) | 4.9 | 3.5 |
| Elastic Recovery (%) at 5% Extension | 92.0 | 95.4 |

EXAMPLE 9 and 10

The compositions of the present invention are desirable for producing nonwoven fabrics. Table VII below shows physical properties of such nonwoven fabric prepared from the antistatic fibers described above. The antistatic properties of these fabrics are comparable to those of the fibers of Table I.

TABLE V

| | Example 9 | Example 10 |
| --- | --- | --- |
| Fabric Composition | 50/50(PET/ lactam terpol) | 75/25(PET/ lactam terpol) |
| Wt. Percent Polyol | 15 | 7.5 |
| Pressing Temperature - °C. | 160 | 160 |
| Speed of Pressing - ft/min | 10 | 10 |
| Dry Tests | | |
| Fabric Weight (oz/yd$^2$) | 1.2 | 1.6 |
| Strip Tenacity (PIOSY) | 6.3 | 3.9 |
| Zero-Span Tenacity (PIOSY) | 8.8 | 5.1 |
| Strip Elongation (%) | 100. | 123.0 |
| Strip Modulus (PIOSY) | 9.3 | 28.4 |
| Rupture Energy (PI) | 4.3 | 4.1 |
| Bonding Efficiency (%) | 70.8 | 75.2 |
| Tongue Tear (POY) | 2.5 | 1.7 |
| Mullen Burst (PSI) | 41.0 | 23.7 |
| Bending Length (inch) | 0.83 | 1.58 |
| Average Abrasion Resistance (Cycles) | 2.5 | 2.0 |

(PIOSY indicates pounds per inch per ounce per square yard, PI indicates pound inch, POSY indicates pounds per ounce per square yard and PSI indicates pounds per square inch).

Another embodiment of the invention is the use of the melt-blend of the polyester and the lactam terpolymers with another polymer component to form composite articles such as side by side bicomponent, or sheath core fibers, e.g. with the said melt blend as the sheath, and the other polymer component as the core. These fibers are useful in the production of anti-static non-wovens. The said melt blend used for the aforesaid purposes should contain at least 5.1 wt. % polyol, and should comprise at least 5% by weight in the composite article. Polymers such as polyamides e.g. nylon 66, polyesters e.g. polyethylene terephthalate or even polymer melt blends, etc. can be physically combined with the said melt blend of the polyester and the lactam terpolymer to form the composite articles. If desired, additives such as flame retardant agents, e.g. tri-(2,3 dibromopropyl) phosphate can also be employed in either of the physical components of the composite fiber to achieve certain desired properties.

The general method for the composite articles comprises forming a melt stream of a blend of a polyester and a lactam terpolymer, which blend has at least 5.1 wt. % polyol content, and also forming a melt stream of another polymeric substance, specifically polyethylene terephthalate or nylon 66, and extruding the said two melt streams together in the configuration for example as a sheath core, a side by side composite fiber or other shaped article. The said composite product has at least 5% by weight of the said blended polymer in the total composite article. Preferred embodiments of the invention are sheath core fibers for example with the blend of the polyester and the lactam terpolymer as the sheath, and with the other polymeric substance, preferably polyethylene terephthalate or nylon 66 as the core of the sheath core fiber. Another preferred embodiment is a side by side composite fiber with the aforesaid components as the two side by side members.

Another embodiment of the invention is the use of the composite article such as sheath core or side by side composite fibers in the production of anti-static nonwoven fabrics. For this purpose the fibers are produced as described above and are then assembled such as by random deposition on a moving belt to form a web. The web is then heat pressed. When utilizing the said melt blends of the polyester with the lactam terpolymer the heat pressing temperature may be from 100° to 210° C.

In this way a nonwoven fabric may be obtained which has unusually good antistatic properties and also good properties which are important in general applications such as tensile properties.

The polyesters of the present invention are prepared by heating together dihydric alcohols or functional derivatives thereof and dibasic carboxylic acids or polyester-forming derivatives thereof such as acid halides, salts, or simple esters of volatile alcohols. Highly polymerized polyesters can be formed into filaments, fibers, films and the like which can be permanently oriented. The most widely known and most important commercially of the polymeric polyesters are those prepared by the condensation of terephthalic acid or dimethyl terephthalate and ethylene glycol or butylene glycol. Carboxylic acids or polyester-forming derivatives thereof may be employed to make polyesters, but aromatic dibasic dicarboxylic acids or dialkyl esters thereof are preferred. Of particular value is terephthalic acid and dialkyl esters thereof such as dimethyl terephthalate and similar dialkyl esters wherein the alkyl groups are the same or different alkyl radicals, preferably alkyl hydrocarbon radicals containing 1 to 5 carbon atoms thereof. Isophthalic acid and its dialkyl esters also may be employed to make the modified polyesters of this invention. Other useful aromatic dicarboxylic acids or esters thereof which may be used include p,p'-dicarboxy diphenyl, naphthalene dicarboxylic acids such as 2,6-dicarboxy naphthalene; p,p'-dicarboxy diphenylsulfone, p,p'-dicarboxy diphenylsulfone, p,p'-dicarboxyphenoxyethane and the like. Aliphatic dicarboxylic acids such as adipic succinic, sebacic and the like may be substituted in part for the aryl dicarboxylic acids.

The other component of the present melt blends is a lactam terpolymer or more specifically a terpolymer of lactam-polyol-polyacyl lactam or lactam polyol-acyl-polylactam.

These terpolymers can be additionally characterized by as having ester, amide, and/or hydroxy end group termination, as well as both ester linkages and amide linkages between monomeric segments thereof. Terpolymers may be prepared by an anionic catalyzed polymerization with a polyester initiator, and the terpolymers are formed from dicarboxylic acid esters and aliphatic polyols and/or aliphatic polyether polyols; as well as through a process comprised of polymerizing together lactams, polyols and polyacyl or acyl polylactams and an alcohol in the presence of a base lactam polymerization catalyst.

The lactam terpolymer as described below is based upon various moieties as components of a block terpolymer. For example, in the embodiment of the lactam-polyol-polyacyl lactam terpolymer, the lactam may be caprolactam, the polyol may be 1,4-butanediol or polyethylene glycol, and the polyacyl lactam may be tetraphthaloyl biscaprolactam or 1,3-benzene disulfonyl caprolactam (U.S. Pat. No. 3,862,262).

A preferred monomer of the terpolymer is ε-caprolactam. Lactam monomers in addition to ε-caprolactam include alphapyrrolidinone, piperidone, valerolactam, caprolactams other than the ε-isomer, capryllactam, lauryllactam and the like. In addition to lactams unsubstituted on their carbon chains, lactams having substituents on the carbon chain which do not inhibit or otherwise adversely affect the polymerization of the lactam are also included within the scope of this invention.

During polymerization the cyclic lactam ring is opened to provide the following monomeric unit

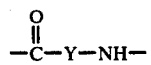

which, together with other lactam molecules, produces a polymeric block of the formula

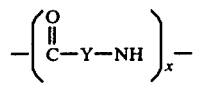

where x is an integer greater than one.
The monomeric lactam unit can also react with the polyacyl alkoxide. Similarly, a polylactam block, when joined with a polyacyl unit forms a polymer segment of the formula

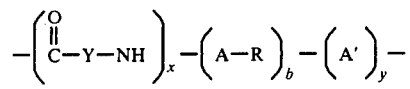

where R is a hydrocarbon group described hereinbelow, A and A' are acyl groups, x is an integer greater than one, y is an integer equal to or greater than one, and b is an integer equal to zero or one.

In the course of the polymerization of the components described above, a polyol can react with the polymerizable lactam unit or block to produce a polymer segment of the formula

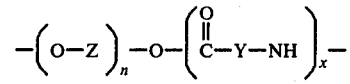

where x and n are integers equal to at least one and where Z is a hydrocarbon, substituted hydrocarbon or acylated hydrocarbon group which, together with the oxygen atom attached thereto, forms a polyether or polyester segment of a polymer molecule.

The Z hydrocarbon, substituted hydrocarbon and acylated hydrocarbon groups can be of any size even polymeric such as polybutadiene, generally limited to about six carbon atoms, said groups being preferably alkylene, arylene, alkylene carbonyl, arylene carbonyl, and mixtures thereof. Even more preferred are unsubstituted aliphatic groups such as methylene, ethylene, propylene, butylene and the like. Other suitable Z groups include phenylene, chlorophenylene, tolylene, isobutylene, isopropylene, ethylcarbonyl, propylcarbonyl, ethylsulfonyl, propylthiocarbonyl and the like.

The preference indicated above for unsubstituted aliphatic Z groups means that terpolymers of this invention which contain polyether segments are preferred over other embodiments which contain polyester segments.

In preferred aspects of this invention, it is theorized that the lactam is present in the polymer in the form of polylactam blocks which are alternated with blocks of polyol and polyol segments to form the polymer. The polylactam blocks when present can be of any size but customarily have molecular weights of at least about 500, preferably at least about 1000.

The polymerized polyol components of the polymers of this invention are formed from polyol intermediates having at least two hydroxy groups. Available commercial polyols of this class are produced by reacting, for example, propylene oxide or ethylene oxide with glycols, glycerol, pentaerythritol, glucose, amines, and the like. Included within the scope of the above class are a large number of suitable compounds ranging from the simple diols such as ethylene glycol to complex polymeric polyols such as poly (ε-carprolactone) diol. Other polyol compounds include alkylene glycols such as diethylene glycol, triethylene glycol, tetraethylene glycol, tetramethylene glycol, propylene glycol, dipropylene glycol, hexylene glycol, 1,2-propanediol, 1,3-propanediol, 1,3-hexanediol, 1,5-pentanediol, butylene glycol, 1,4-butanediol, dicyclopentadiene glycol, heptaethylene glycol and isopropylidene bis (p-phenyleneoxypropanol-2); diols other than alkylene glycols such as pyrocatechol, resorcinol, hydroquinone; hydroxyethyl acrylate and hydroxypropyl methacrylate; polyols having more than two hydroxy functions such as glycerol, pentaerythritol, 1,2,6-hexanetriol, 1-trimethylol propane, pyrogallol and phloroglucinol; polymeric polyols such as polyethylene glycols, polypropylene glycols, polyoxypropylene diols and triols, castor oils, polybutadiene glycols and polyester glycols, and a large number of compounds containing substituents other than hydroxy groups such as 2,4-dichlorobutylene glycol and 2,2'-4,4' bis (chlorohydroxyOphenyl) ether. In addition to all the hydroxy compounds set forth above, the thio compounds analogous to the above compounds having sulfur atoms in place of oxygen are also included within the scope of the invention. A few examples include hydroxyethyl thioglycolate, ethylene glycol bis(thioglycolate), pentaerythritol tetrakis-(thioglycolate) and thiodiglycol.

If the polyol intermediate is a polymer, the molecular weight of the polyol can be any amount. Commercially available polymeric polyol compounds have molecular weights from 200 to 5000, but polymers with molecular weights outside that range are also useful in the practice of the instant invention. If the polyol intermediate or segment is a single molecule having at least two hydroxy groups such as ethylene glycol, a suitable polyol segment according to the invention would have a molecular weight of at least 62.

The third component of the terpolymers has the following structural configuration in the polymer chain:

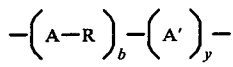

where R is a hydrocarbon group, A and A' are acyl radicals, y is an integer equal to at least one, and b is an integer equal to zero or one.

The R group can be any hydrocarbon group having at least two valence bonds for attachment to the acyl groups shown in the above formula. Examples include functional groups obtained by the removal of hydrogen atoms from methane, ethane, propane, hexane, dodecane, benzene, toluene, cyclohexane and the like. The polyvalent R group can be of any size but is preferably limited to about twenty carbon atoms, and more preferably about eight carbon atoms. If the integer "y" is one, the linkage will be a diacyl group. The A group can be any acyl group and preferably are

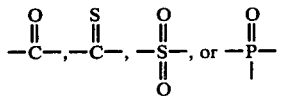

groups. Most preferred among the above groups is the carbonyl group.

Values for the integer "y" have a direct relationship to the thermoplasticity of the terpolymer. If the integer "y" is greater than one, the linkage will be a higher polyacyl. The higher the value of "y," the more highly crosslinked will be the finished polymer. Values for "y" can be as high as six or eight, but more preferably do not exceed two or three.

The polymerized product comprising the aforementioned components can have a number of different structures depending upon the process conditions and the relative proportions of ingredients used in the reaction system. Polymers can be prepered having relatively small segments of lactam units joined to similarly short segments of polyol units through the polyacyl linkage described above. Or large segments of one polymeric component can be combined with a larger number of comparatively small segments of another polymeric unit, which small segments are joined to one another through the polyacyl linkage as well as to the other type of polymeric component. Or segments of varying sizes of both the lactam and the polyol polymeric units can be combined through the polyacyl components to form a highly random terpolymer. Another form of polymer within the scope of this invention are block polymers, where moderately large size blocks or segments of the lactam and polyol polymeric units are positioned alternately in the polymer chain and joined through the polyacyl group described above. If the polyacyl linkages are, for purposes of simplification, considered to be a part of either a lactam or polyol block, then the block polymers of this invention can be discussed in terms of two alternating blocks designated as A and B blocks, instead of in terms of complicated patterns of three blocks designated as A, B and C blocks. Block polymers prepared according to this invention can have three general structural configurations, AB, ABA and a repeating pattern of AB segments. Following a general characterization of a block copolymer prepared within the scope of this invention as AB, ABA or repeating AB, it should be recognized that the exact structural configuration may vary somewhat from the general characterization of the polymer. As an illustration, one theoretical formula for a lactam-polyolpolyacyl lactam block terpolymer of the repeating AB type could be

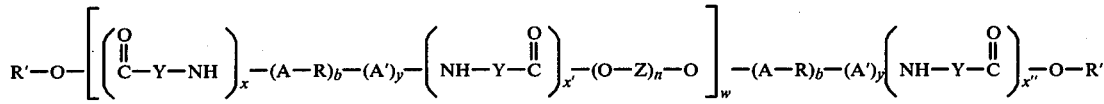

where y, x, x', x'', n and w are all integers equal to one or more; b is an integer equal to zero or one; R is a divalent or polyvalent hydrocarbon group; $(O-Z)_n$ is a polyol segment or a polymeric moiety and Z is a hydrocarbon or substituted hydrocarbon group; Y is an alkylene group having at least three carbon atoms; A and A' are acyl groups; and R' is an aliphatic or substituted aliphatic hydrocarbon wherein the ester group is attached to other than an aromatic radical.

If for instance Y is a straight chained alkylene group, A and A' are carbonyl groups, Z is ethylene, —CH$_2$CH$_2$—, and R is phenylene, the terpolymer would be a caprolactam-ethylene glycol polymer where the caprolactam segments of the polymer are joined to one another and to the ethylene glycol segments through terephthaloyl linkages. Other lactam-polyol polymers, both of the AB, ABA as well as the repeating AB type, will become immediately apparent to those skilled in the art in view of this disclosure. It should therefore be noted that the above structural formula is set forth for illustrative purpose only, and is not intended as a limitation of the polymers within the scope of the invention.

When the polymers of this invention are of the ABA type, where one block of one type of polymer segment is located between two blocks of the other type of polymer segment, the polymers can be of either the polyol-lactam-polyol type or the lactam-polyol-lactam type. Of the two types, the latter is a preferred type of ABA polymer.

If the lactam-polyol-polyacyl lactam polymer is a block polymer, the polyol blocks can, like the polylactam blocks, be of any size but customarily have molecular weights of at least about 500, preferably at least about 1000. The ratio of the number of lactam to polyol blocks can also vary. Since the block polymers can be of either the type designated as AB, ABA or repeating AB, the ratio of lactam blocks to polyol blocks can vary from 2:1 to 1:1 to 1:2. Mixtures of two or more block polymers having different ratios of the lactam and polyol blocks will produce ratios of polymer blocks intermediate between the above stated ratios.

In the above theoretical formula for a lactam-polyol block terpolymer, the polyacyl linkage is represented as located between two lactam polymer segments as well as between a polyether segment and a lactam polymer segment. As a practical matter, the polyacyl linkages will also be located occasionally between two polyol blocks. It should be noted, moreover, that the polyacyl linkages need not invariably be psoitioned between lactam and polyol blocks since the necessary linkage can be provided in the form of an ester linkage by the oxygen atom of the polyether segment and the carbonyl group of a polylactam segment.

Following is a general characterization of the lactam polyol-polyacyl lactam terpolymer produced according to the invention. As an illustration, the lactam-polyol-polyacyl lactam or acyl polylactam terpolymer has the general formula:

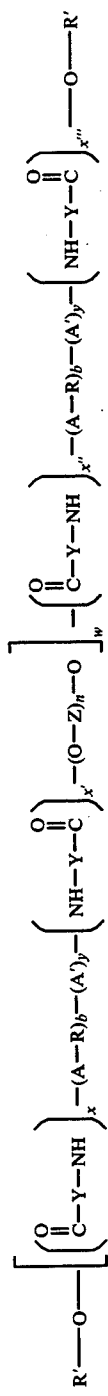

Wherein $(O-Z)_n$ is a polyol segment or a polymeric moiety and Z is a hydrocarbon or substituted hydrocarbon group said group being alkylene, arylene, alkylene carbonyl, arylene carbonyl, and mixtures thereof; A and A' are acyl groups selected from

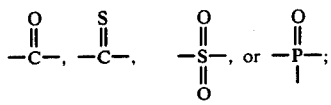

R is a polyvalent hydrocarbon group;
Y is an alkylene or substituted alkylene having from about 3 to about 14 carbon atoms;
y is an integer equal to at least one, and
b is an integer equal to zero or one; x, x', x'' and x''' are integers and the total number of x's is equal to 2w+2; and n and w are integers equal to one or more.

What is claimed:

1. A polymeric composition having improved antistatic properties, said composition comprising a melt blend of a polyester and a block terpolymer selected from the group consisting of lactam-polyolpolyacyl lactam and lactam-polyol-acylpolylactam, said composition having at least 5.1 wt. % polyol.

2. Fibers comprising the polymeric composition of claim 1.

3. A shaped article comprising the polymeric composition of claim 1.

4. Nonwoven fabrics comprising the polymeric composition of claim 1.

5. A composition as in claim 1 in which the polyester is polyethylene terephathalate.

6. A composition as in claim 1 in which the polyester is polybutylene terephthalate.

7. A polymeric composition having improved antistatic properties and comprising a melt blend of a polyester and a block terpolymer selected from the group consisting of lactam-polyol-polyacyl lactam and lactam-polyol-acylpolylactam, said composition having from 5.1 to 25 wt. % polyol.

8. Process for improving the antistatic properties of a polyester which comprises forming a melt blend composition with a block terpolymer selected from the group consisting of lactam-polyol-polyacyl lactam and lactam-polyol-acylpolylactam, with the said terpolymer being present at a concentration which provides from 5.1 to 25 wt. % polyol relative to the total composition.

9. A process for improving the antistatic properties of shaped objects, fibers or fabrics which comprises providing a two component system by melting with a polyester a terpolymer selected from the group consisting of lactam-polyol-polyacyl lactam and lactam-polyol-acylpolylactam, in sufficient quantity to provide at least 5.1% by wt. polyol in the product, and forming the melt blend into shaped objects, fibers or fabrics.

10. A process according to claim 1 wherein the said polyester is polyethylene terephthalate.

11. A process according to claim 1 wherein the polyester is polybutylene terephthalate.

12. A nonwoven fabric comprised of melt blended fibers of a polyester in combination with a terpolymer selected from the group consisting of lactam-polyol-polyacyl lactam and lactam-polyol-acylpolylactam in sufficient quantity to provide at least 5.1% by wt. polyol in the product.

13. A method of producing a composite article having improved antistatic properties which comprises forming a melt stream of a blend of a polyester and a terpolymer selected from the group consisting of lactam-polyol-polyacyl lactam and lactam-polyol-acylpolylactam, which blend has at least 5.1 wt. % polyol content, forming a melt stream of another polymeric substance, and extruding the said two melt streams together in a composite configuration, the said composite configuration having at least 5% by wt. of the said blend in the total composite article.

14. The product of claim 13.